US012771024B1

(12) United States Patent
Jayasimha et al.

(10) Patent No.: US 12,771,024 B1
(45) **Date of Patent: *Oct. 20, 2026**

(54) COMPENSATING OSCILLATIONS IN A LARGE-APERTURE PHASED ARRAY ANTENNA

(71) Applicant: AST & Science, LLC, Miami, FL (US)

(72) Inventors: Sriram Jayasimha, Midland, TX (US); Huiwen Yao, Potomac, MD (US)

(73) Assignee: AST & Science, LLC, Miami, FL (US)

( * ) Notice: Subject to any disclaimer, the term of this patent is extended or adjusted under 35 U.S.C. 154(b) by 121 days.

This patent is subject to a terminal disclaimer.

(21) Appl. No.: 18/739,507

(22) Filed: Jun. 11, 2024

Related U.S. Application Data

(63) Continuation of application No. 17/543,060, filed on Dec. 6, 2021, now Pat. No. 12,046,831, which is a continuation of application No. 17/175,428, filed on Feb. 12, 2021, now Pat. No. 12,040,553.

(60) Provisional application No. 62/976,107, filed on Feb. 13, 2020.

(51) Int. Cl.
*H01Q 3/30* (2006.01)
*H01Q 1/28* (2006.01)
*H01Q 9/04* (2006.01)

(52) U.S. Cl.
CPC ............... *H01Q 3/30* (2013.01); *H01Q 1/288* (2013.01); *H01Q 9/0407* (2013.01)

(58) Field of Classification Search
CPC .......... G01S 7/40; H01Q 1/288; H01Q 3/267; H01Q 3/30; H01Q 9/0407; H01Q 21/00; H01Q 21/061
See application file for complete search history.

(56) References Cited

U.S. PATENT DOCUMENTS 3,803,626 A * 4/1974 Garrett .................. G01R 29/00 343/894
5,151,710 A * 9/1992 de Place .................. G01C 9/00 343/890
5,163,176 A * 11/1992 Flumerfelt .......... G01S 13/9092 342/174
5,185,608 A * 2/1993 Pozgay ................... G01S 13/87 342/25 A
5,187,486 A * 2/1993 Kolzer ................... H01Q 3/267 342/173
5,430,451 A * 7/1995 Kawanishi ............... B64G 1/22 343/915
5,440,320 A * 8/1995 Lach .................... H01Q 15/147 343/915
5,623,270 A * 4/1997 Kempkes ............. H01Q 3/2694 342/174
5,666,128 A * 9/1997 Murray .................. H01Q 1/288 343/705

(Continued)

*Primary Examiner* — Peter M Bythrow
(74) *Attorney, Agent, or Firm* — Botos Churchill IP Law LLP

(57) ABSTRACT

A phased array has a plurality of antenna element structures each having a planar surface. The antenna element structures are connected to form a structural array with a planar array surface. A processing device generates a beam having a beam phase at the plurality of antenna element structures, monitors and determines in real time for structural displacement of the plurality of structures, determines a correction, and adjusts the beam phase based on the correction.

20 Claims, 9 Drawing Sheets

(56) References Cited

U.S. PATENT DOCUMENTS

| | | | | | |
|---|---|---|---|---|---|
| 5,894,291 | A * | 4/1999 | Lee | H01Q 1/1242 | 343/890 |
| 6,082,719 | A * | 7/2000 | Shtarkman | F16F 15/005 | 188/266.7 |
| 6,084,545 | A * | 7/2000 | Lier | H01Q 3/267 | 342/174 |
| 6,320,538 | B1 * | 11/2001 | Lalezari | H01Q 3/267 | 342/368 |
| 6,333,712 | B1 * | 12/2001 | Haugse | H01Q 1/005 | 342/368 |
| 6,680,697 | B2 * | 1/2004 | Bruzzone | H01Q 1/273 | 342/372 |
| 6,720,918 | B2 * | 4/2004 | Reckdahl | H01Q 1/288 | 342/358 |
| 6,879,875 | B1 | 4/2005 | Hu et al. | | |
| 6,954,173 | B2 * | 10/2005 | Mrstik | H01Q 3/267 | 342/368 |
| 7,460,067 | B2 * | 12/2008 | Allen | H01Q 19/12 | 342/368 |
| 7,522,097 | B2 * | 4/2009 | Wakeman | G01S 7/4026 | 342/149 |
| 8,077,083 | B2 * | 12/2011 | Blake | H01Q 3/267 | 342/368 |
| 8,184,042 | B2 * | 5/2012 | Ray | H01Q 3/267 | 342/174 |
| 8,260,336 | B2 * | 9/2012 | Johansson | H01Q 3/30 | 342/372 |
| 8,930,047 | B2 * | 1/2015 | Robinson | H01Q 21/06 | 342/359 |
| 8,957,807 | B2 * | 2/2015 | Mills | G01S 7/4026 | 342/174 |
| 8,972,310 | B2 * | 3/2015 | Kearns | G01M 5/0091 | 706/12 |
| 9,019,153 | B1 * | 4/2015 | Schuss | G01S 7/40 | 342/174 |
| 9,973,266 | B1 | 5/2018 | Avellan et al. | | |
| 10,587,054 | B2 * | 3/2020 | Rosenkrantz | H01Q 3/26 | |
| 10,884,094 | B2 * | 1/2021 | Johnson | H01Q 3/08 | |
| 2002/0067311 | A1 * | 6/2002 | Wildey | H04B 7/18515 | 342/372 |
| 2003/0020648 | A1 * | 1/2003 | Fienup | H01Q 3/267 | 342/194 |
| 2007/0194982 | A1 * | 8/2007 | Stove | H01Q 1/005 | 342/174 |
| 2007/0222671 | A1 * | 9/2007 | Nohmi | G01N 21/3581 | 342/142 |
| 2010/0007555 | A1 * | 1/2010 | Ezal | H01Q 25/00 | 342/417 |
| 2011/0001660 | A1 * | 1/2011 | Ray | H01Q 3/267 | 342/174 |
| 2011/0205130 | A1 * | 8/2011 | Mrstik | H01Q 21/0018 | 343/703 |
| 2012/0050106 | A1 * | 3/2012 | Quan | H01Q 3/2676 | 342/368 |
| 2017/0229782 | A1 * | 8/2017 | Adriazola | H01Q 13/28 | |
| 2018/0083718 | A1 * | 3/2018 | Ward | H04B 1/40 | |
| 2018/0359023 | A1 | 12/2018 | Howard | | |
| 2019/0140349 | A1 * | 5/2019 | Fikes | H01Q 3/267 | |
| 2019/0238216 | A1 | 8/2019 | Avellan et al. | | |
| 2020/0361635 | A1 | 11/2020 | Braun et al. | | |
| 2020/0365966 | A1 | 11/2020 | Honour et al. | | |
| 2020/0366237 | A1 | 11/2020 | Hernandez Bahlsen et al. | | |

* cited by examiner

FIG. 7(a)
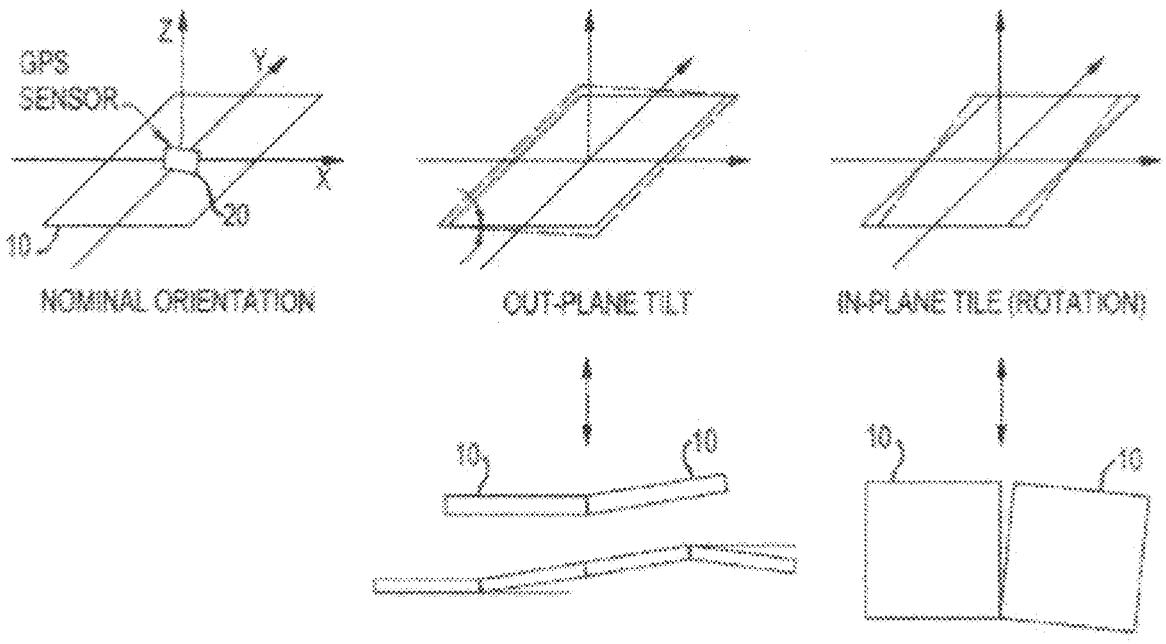
FIG. 7(b)
FIG. 7(c)
FIG. 8(a)
FIG. 8(b)
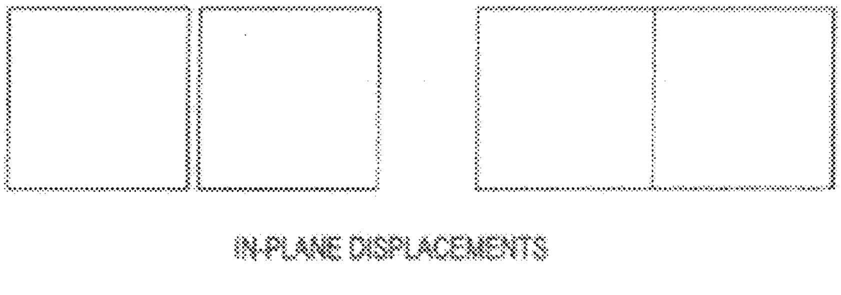

COMPENSATING OSCILLATIONS IN A LARGE-APERTURE PHASED ARRAY ANTENNA

CROSS REFERENCE TO RELATED APPLICATIONS

This application is a continuation of U.S. patent application Ser. No. 17/543,060, filed Dec. 6, 2021, which is a continuation of U.S. patent application Ser. No. 17/175,428, filed Feb. 12, 2021, which claims the benefit of and priority to U.S. Provisional Application No. 62/976,107, filed on Feb. 13, 2020, the entire disclosures of which are incorporated herein by reference.

TECHNICAL FIELD

This disclosure relates to the fields of motion determination and motion control for large, flexible space structures. Flexible structures are those whose stiffness is low along one or more axes such that the structure exhibits broad, slow differential displacements along that axis when exposed to external forces and torques. The disclosure resolves challenges of measuring and controlling this motion. The disclosure includes a sensor suite for measuring displacements, a means of integrating these measurements and estimating displacements in real time, and control implementation.

BACKGROUND

U.S. Pat. No. 9,973,266 and U.S. Publ. No. 2019/0238216 show a system for assembling a large number of small satellite antenna assemblies in space to form a large array. The entire content of the '266 patent is incorporated herein by reference. As disclosed in the '266 Patent, FIGS. 1(*a*), 1(*b*) show a satellite communication system 100 having an array 300 of common or small satellites 302 and a central or control satellite 200. The small satellites 302 communicate with end users 500 within a footprint 400 on Earth, and also communicate with the control satellite 200, which in turn communicates with a gateway 600 at a base station. The small satellites 302 can each include, for example, a processing device (e.g., a processor or controller) and one or more antenna elements. And the control satellite 200 can include a processing device and one or more antenna or antenna elements.

BRIEF SUMMARY

A large array in space is formed by joining several smaller elements by connectors, such as joints, hinges, tape-springs. Each element can be considered as rigid, flexure being largely in the connectors that connect the elements to each other. The connectors have a storage configuration in which they are bent so that the antenna elements 300 are folded upon each other to be compact for transport into space. And the connectors have default bias to a deployed configuration in which they expand so that the antenna elements are unfolded and expand into a large planar configuration in space. In addition, the control satellite 200 need not be distinct from the small satellites 302, but rather the control satellite 200 can be connected to the small satellites 302, such as directly embedded within the array 100.

However, the low mass-per-unit aperture arrays can physically bend or deviate from their nominal positions due to external forces in deployed orbit around the Earth (e.g., low earth orbit (LEO), medium earth orbit (MEO), etc.). For example, there can be both displacement and rotation in the connectors. Analysis has revealed that there could be as much as 70 cm displacement in an 8 m diameter array, which can be corrected, for example, to displacement of 10 cm or less by appropriate mechanical or structural compensations. This can be achieved by use of, e.g., torque rods that apply a magnetic moment against the Earth's magnetic field which moves the connectors toward their fully deployed configuration and moves the array of antenna elements toward the full planar configuration. Residual displacement (after the mechanical compensation) is compensated by beamforming corrections, for example by applying a phase correction to the beam. Thus, the structural compensation applies a coarse correction, whereas the phase adjustment applies a fine correction. The maximum displacement that beamforming compensation can correct for is limited to a fraction of the wavelength of the frequency used (the wavelength at 900 MHz is 33.33 cm).

Accordingly, a system and method are provided with various mechanical modes of deviations, their effect on beamforming and the methods for compensating structural deflections.

BRIEF DESCRIPTION OF DRAWINGS

FIG. 3(*b*) shows a front view, top view, and right-side view of the array of FIG. 3(*a*).

FIG. 4(*b*) shows a front view, top view and right-side view of the array of FIG. 2(*a*).

FIG. 5(*b*) shows a front view, top view and right-side view of the array of FIG. 3(*a*);

FIGS. 7(*a*)-7(*c*) show in-plane and out-plane tilts that may be present in each small satellite.

FIGS. 8(*a*), 8(*b*) show relative in-plane and out-plane displacements that may be present across small satellites.

DETAILED DESCRIPTION

Figure 1A:
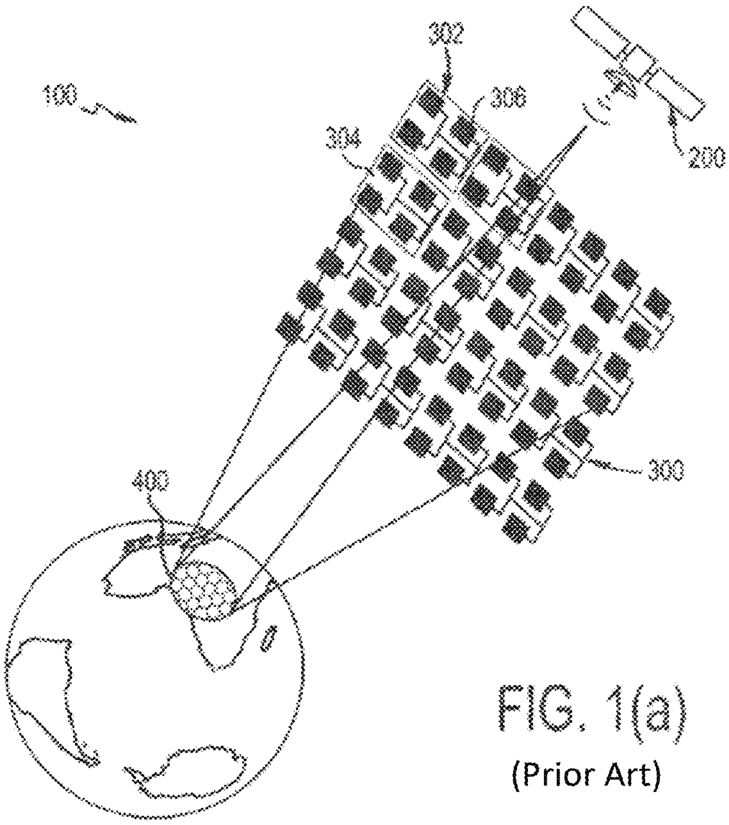
FIG. 1(a) (Prior Art)
FIGS. 1(*a*), 1(*b*) show a known phased array.

In describing the illustrative, non-limiting embodiments of the disclosure illustrated in the drawings, specific terminology will be resorted to for the sake of clarity. However, the disclosure is not intended to be limited to the specific terms so selected, and it is to be understood that each specific term includes all technical equivalents that operate in similar manner to accomplish a similar purpose. Several embodiments of the disclosure are described for illustrative purposes, it being understood that the disclosure may be embodied in other forms not specifically shown in the drawings.

Figure 2:
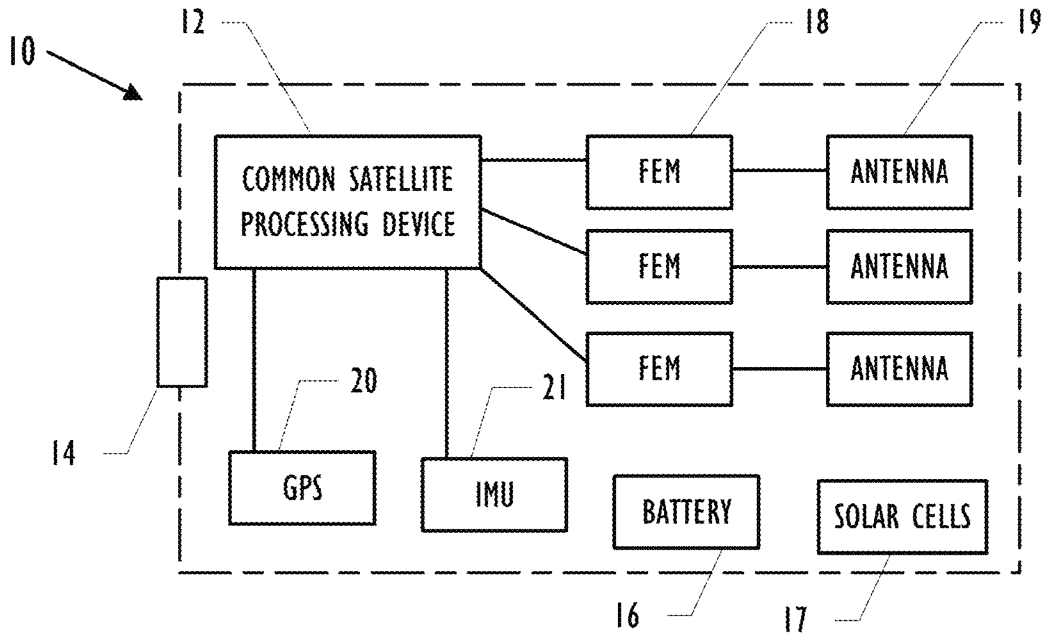
FIG. 2 is a block diagram of a structure.
Figure 1B:
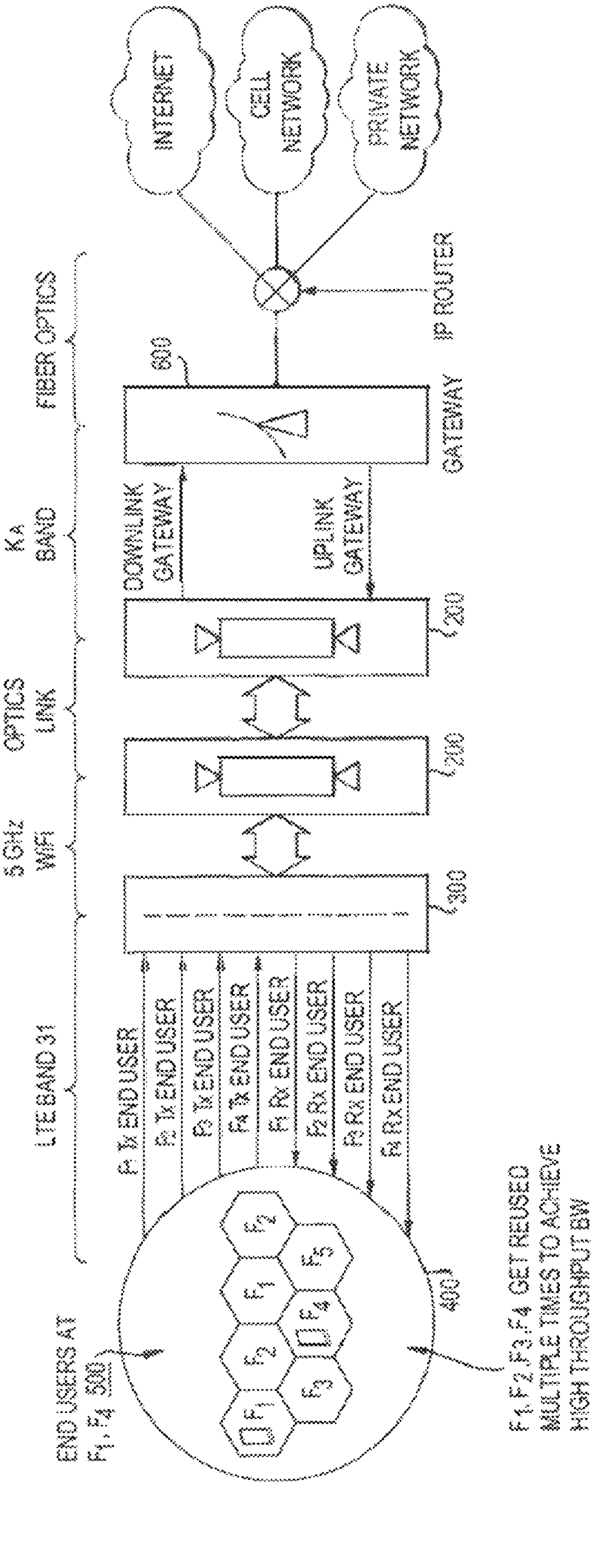
FIG. 1(b) (Prior Art)

Referring to FIG. 2, in one example embodiment, only the electronics of a single small satellite 302 is shown. In this embodiment, the structure 10 is an antenna assembly or common small satellite that is connected to other antenna assemblies in a large antenna array 5 (FIG. 3), such as in the antenna assembly 300 and array 100 of the '266 Patent (FIG. 1(*a*)). The overall system forms an Altitude and Orbit Control System (AOCS) that can include the common satellite 10, control satellite 200, and/or ground station. The control satellite 200 can be fixedly connected to the small satellites 302, such as at the center of the array as in 5 (FIG. 3(*a*)).

Figure 3A:
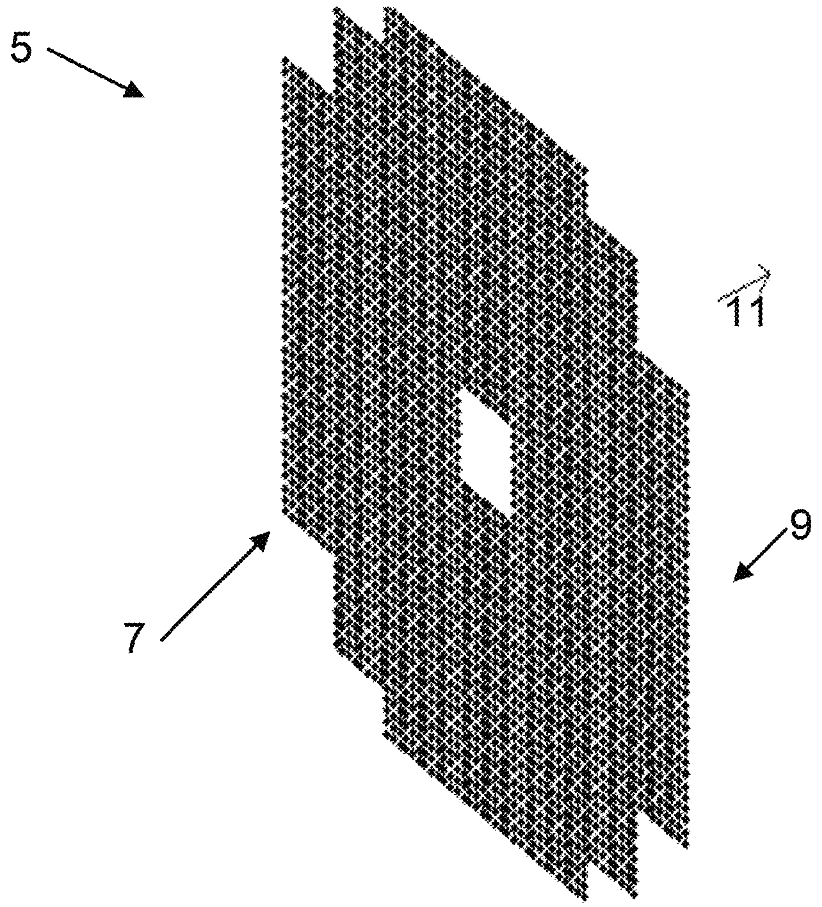
FIG. 3(*a*) is a perspective view of a large phased array formed by integrating several small satellites in space.
Figure 3B:
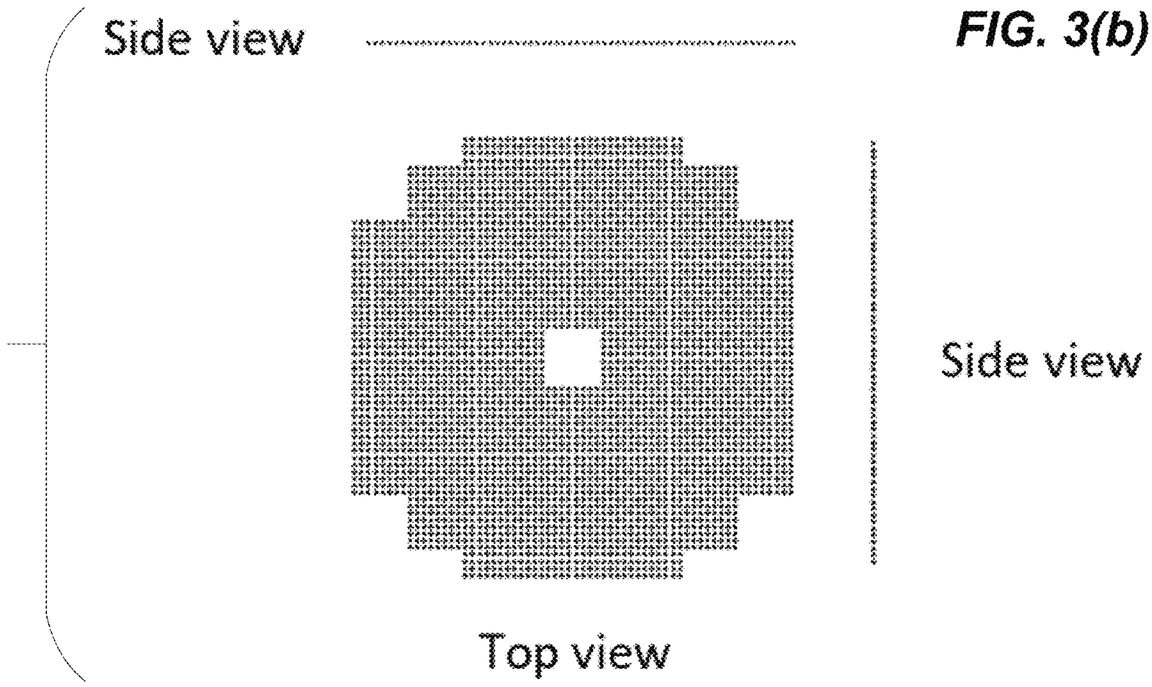

The structure 10 is flat and rectangular or square, with the communication components (e.g., antenna elements 19) at one side surface 7 (FIG. 3(*a*)) facing the Earth (nadir) to communicate with user devices (e.g., cell phones) and an opposite side surface 9 (FIG. 3(*a*)) facing in the opposition direction (zenith) with solar cells 17 that generate solar power for use by the electronic components, e.g., a processing device 12, antennas 19, battery 16, and antenna front end modules 18.

The antenna element 10 also has one or more connectors 14, such as a hinge, joint, spring or tape-spring connector, that connect the antenna element 10 to one or more neighboring antenna elements 10. As shown, the antenna element 10 can be rectangular or square and encompass multiple antenna elements 300, and one or more connectors can be positioned at or along one or more of the edges or sides of the antenna element 10. Accordingly, the antenna elements 10 can have a storage configuration in which the antenna elements 10 are folded upon each other for storage, and an operating configuration in which the antenna elements 10 are substantially planar and unfolded for use in space. In this manner, large numbers of antenna elements 10 can be transported to space in the storage configuration and deployed into the operating configuration in space. It will be recognized that the system can utilize any suitable connection system, for example such as the one shown and described in U.S. Patent Pub. Nos. 2020/0361635, 2020/0366237, and 2020/0365966, the entire contents of which are hereby incorporated by reference.

The connectors can be subject to bending or flexing in the operating configuration. For example, the maximum flex at the connector 14 might be several degrees. Any flex results in a deviation of the antenna elements from the planar configuration in which the communication side (and/or the solar side) of the plurality of antenna elements are planar. That deviation, which is undesirable since it can affect beam formation. The maximum flex angle is limited to a couple of degrees (less than about 2° in each connector) at the connector 14, as a function of the drivers of the mechanical design.

Thus, it is important that the structure 10 and the array 5 (FIG. 3) remain as flat (i.e., planar) as possible to maximize solar power generation by the solar side and communication with the Earth on the communication side. It is therefore desirable for the array 5 to be substantially flat on both the solar side and the communication side, i.e., that the individual structures 10 are flat on both sides and that they are planar or co-planar with one another on both sides so that the overall array 5 is planar on both sides. However, the structure 10 and/or array 5 is subject to forces in space that can cause the structure 10 or array 5 to flex or bend.

FIGS. 3(*a*), (*b*) show a nearly circular large planar phased array 5 formed in space by integrating many small satellites 10. Each small satellite could host a processing device 12 (e.g., processor) and a few antenna elements 19. Hundreds of such small satellites together could form a large phased array with thousands of overall antenna elements. In one embodiment, each small satellite (referred to here as a micron) has an antenna assembly with antenna elements 19 arranged in four rows and four columns in a square shape. The overall phased array formed by the interconnection of several small satellites could take a square, or a rectangular or a circularized shape as desired by the application. Any suitable small satellite can be utilized, such as shown and describe in U.S. Pub. Nos. 2020-0361635, 2020-0366237, and 2020-0365966, the entire contents of which are hereby incorporated by reference.

The opening in the array (here shown as the center, though the opening can be positioned at any suitable position) enables placement of a central processor to control all the small satellites via high-speed serial links and a set of antennas for communication with the ground station. The antenna elements 19 are positioned at the communication side surface 7 of the array and the solar cells are positioned at the solar side 9 of the array 5. The arrow 11 shows the boresight, which for a planar phased array refers to a normal to the array's plane. Any beam off-boresight is called an edge beam (e.g., FIG. 6).

The small satellites 10 communicate with end user devices (such as cell phones) on Earth, and with the central processor 200, which in turn communicates with a gateway at the ground station. The signals communicated to/by the small satellites are aggregated together, such that the small satellites collectively transmit and receive signals to the end user devices. However, any bending or flexing of the array can cause the signals from the individual small satellites to deviate or be out of phase from the desired phase.

Figure 4A:
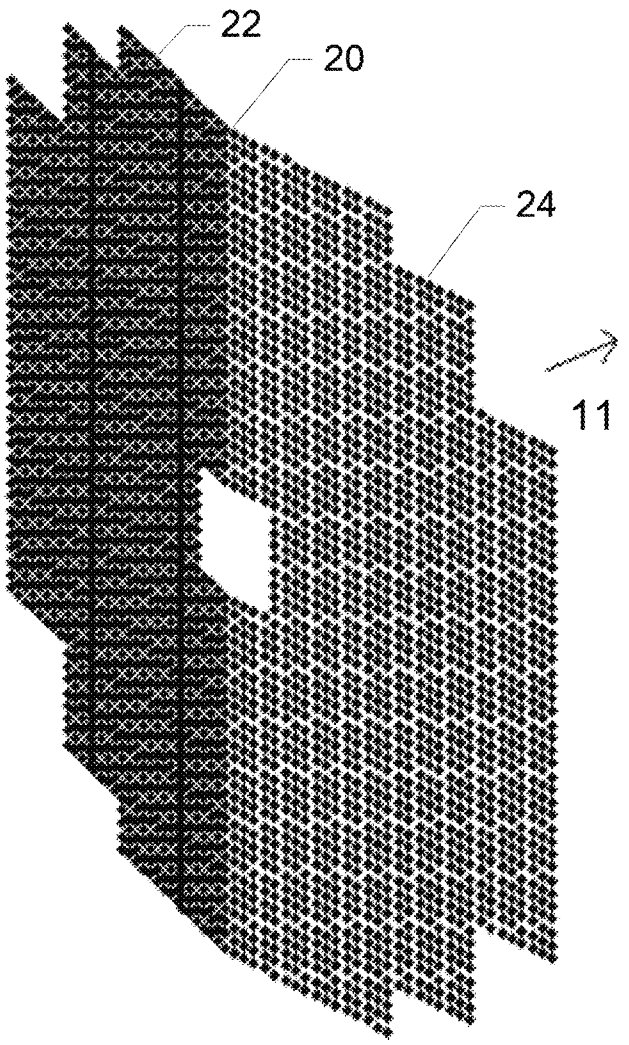
FIG. 4(*a*) is a perspective view showing bending of a satellite antenna array due to external forces.
Figure 4B:
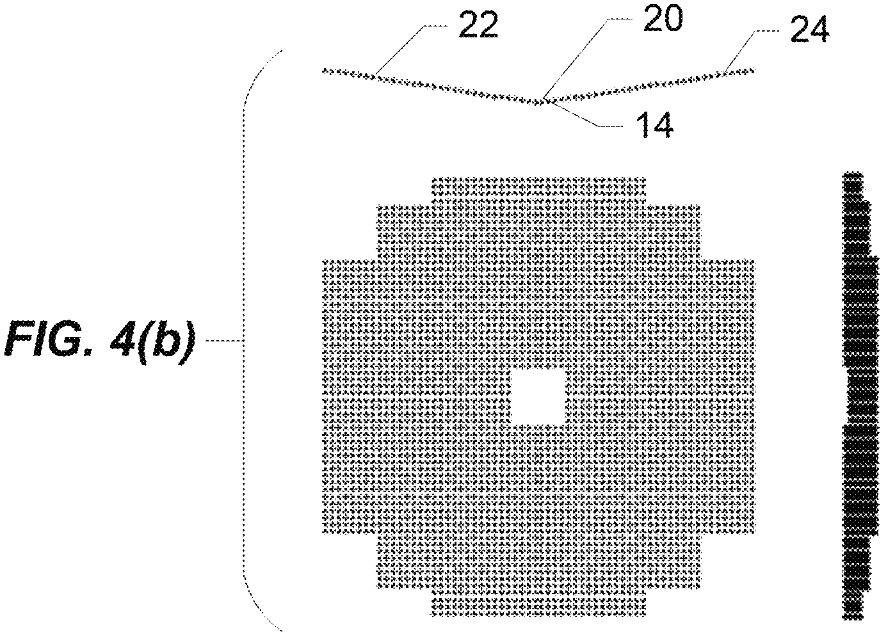

FIGS. 4(*a*), 4(*b*), 5(*a*), 5(*b*) show the gradual bending effect in large arrays from the center towards the edge of the arrays. The individual antenna assemblies are rigid, but are mechanically coupled to one another by the connectors 14. Those connectors hold the small satellites together, but are subject to bending or flexing, and tend to oscillate inwards and outwards at low frequency, with maximum displacements at the extremities, depending on the external forces. As the mass per unit aperture is reduced, the stiffness of the array is reduced and the array encounters greater flexure. The arrows in FIGS. 4(*a*), 5(*a*) point to the boresight of the array.

Figure 5A:
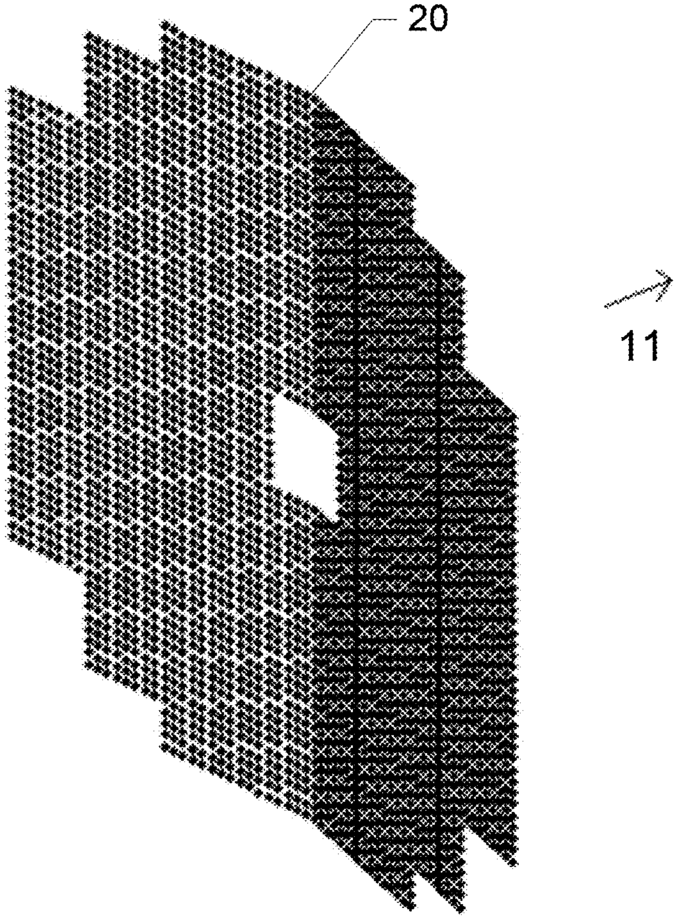
FIG. 5(*a*) is a perspective view showing bending of a satellite antenna array due to external forces.
Figure 5B:
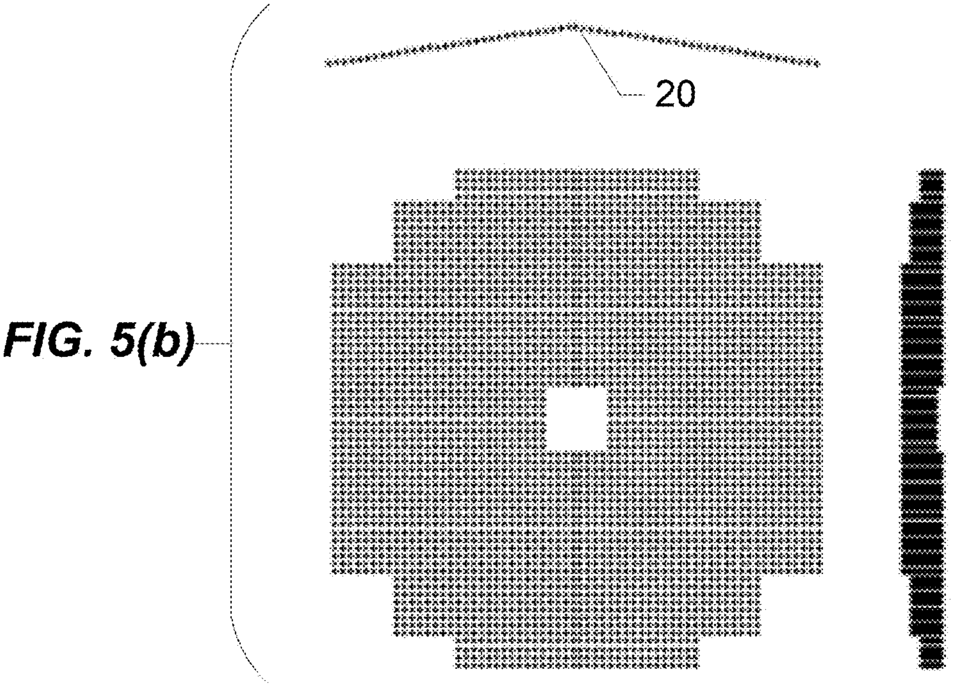

FIGS. 4(*a*), 4(*b*) illustrate the inward (towards the arrow 11 or boresight) flexing of the array, and FIGS. 5(*a*), 5(*b*) illustrate the outward (away from the arrow 11 or boresight) flexing of the array. The array is imagined to be in a nominal plane that is normal or perpendicular to the boresight. The flexing causes deviation from the nominal plane.

The example of FIGS. 4, 5 shows is a single bend 20 in the array 5. In the particular example embodiment shown, there is a single bend 20 that is located at a center diameter array 5 that passes through the center of the array 5, forming a left half 22 and a right half 24. Each of the left half 22 and right half 24 are substantially planar, such that the left half 22 is in a first plane and the right half 24 is in a second plane, and an angle is formed between the left and right planes at the bend 20. It is noted that the bend 20 extends the entire length of the array diameter. However, other bends are possible, for example bends that only partially extend along the array, bends that are offset from the center diameter, bends that extend at other positions and locations that do not pass through the center of the array, and multiple bends. And, while the bend 20 is shown having a sharp angle between the left and right halves 22, 24, the bend can be more curved. And, the left and right halves 22, 24 need not be planar, but can be curved due to slight deviations or bends at connectors between antenna modules 10.

Figure 6:
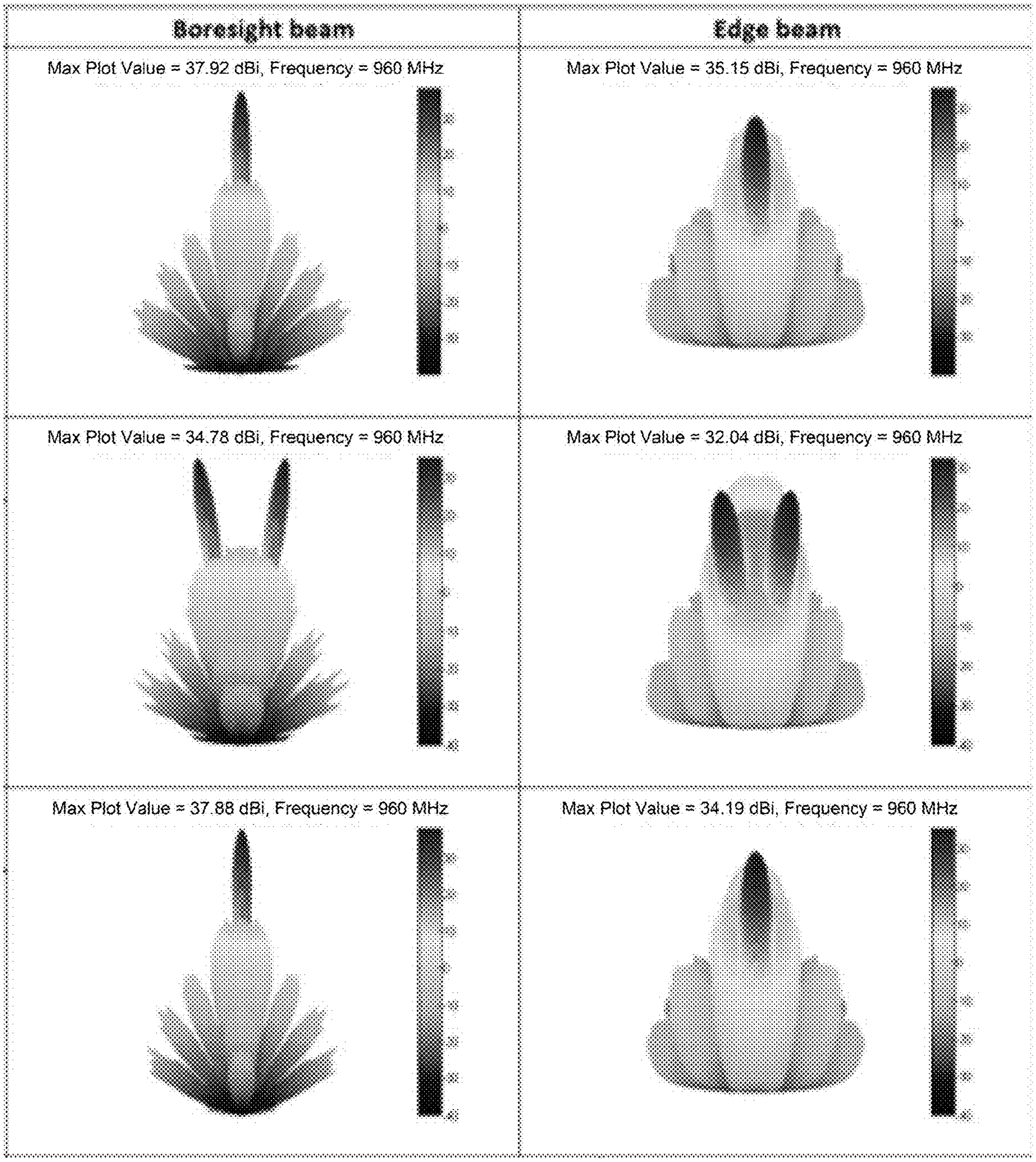
FIG. 6 shows radiation patterns.

Referring to FIG. 6, the first row of measurements shows the expected radiation patterns from a 10.3 m planar array of FIG. 3 while forming the beams towards the boresight of the array and edge of the footprint. The second row of measurements in FIG. 6 shows the expected radiation patterns for an array of FIGS. 4, 5 with 8.7° bending from nominal plane without any compensation for change in antenna elements' position while beamforming. As shown, there is a distorted radiation pattern with dual main-lobe and the reduced array gain due to bending of the array. The last row of measurements shows that radiation patterns with nearly same gain and pattern as the nominal array can be generated even for a bent array, by compensating for change in antenna element position in accordance with the present disclosure.

While FIGS. 4, 5 show uniform bending effect, there could be random perturbations in the position of each small satellite structure 10 while deploying and attaching to neighboring small satellites. FIG. 7(*a*) shows a nominal orientation for a structure 10, and FIGS. 7(*b*)-7(*c*), 8(*a*)-8(*b*) show such perturbations in the form of in-plane and out-plane tilts and displacements for a plurality of antenna elements. FIG. 7(*a*) and the top drawings of FIGS. 7(*b*), 7(*c*), each show a single antenna structure 10 (which may have multiple antenna elements). FIGS. 8(*a*), 8(*b*), and the bottom drawings in FIGS. 7(*b*), 7(*c*) show multiple structures 10 coupled to one another by a connector, as well as bending at the connector. Such perturbations could also degrade the performance of the generated beam if the deviated antenna positions are not considered while forming the beams. As the deployment places the small satellites at their nominal positions, these perturbations are small deviations around the nominal positions typically effecting the side-lobe performance as tabulated in Table 1, which shows the effect of random perturbations in antenna element position relative to nominal spacing (for an example array).

General displacements such as those in FIG. 8 are not controllable as described in the current embodiment, but such displacements are observable using the determination methods described herein if they are sufficiently large. Thus, FIGS. 4, 5, 7, 8 depict the main types of perturbations that are likely to occur, any of which may increase the distortion of the radiation pattern. The embodiment described herein has significant utility for near-planar arrays but may be utilized in systems with larger non-planarity if a majority of such non-planarity is the result of modal perturbations.

Figure 9:
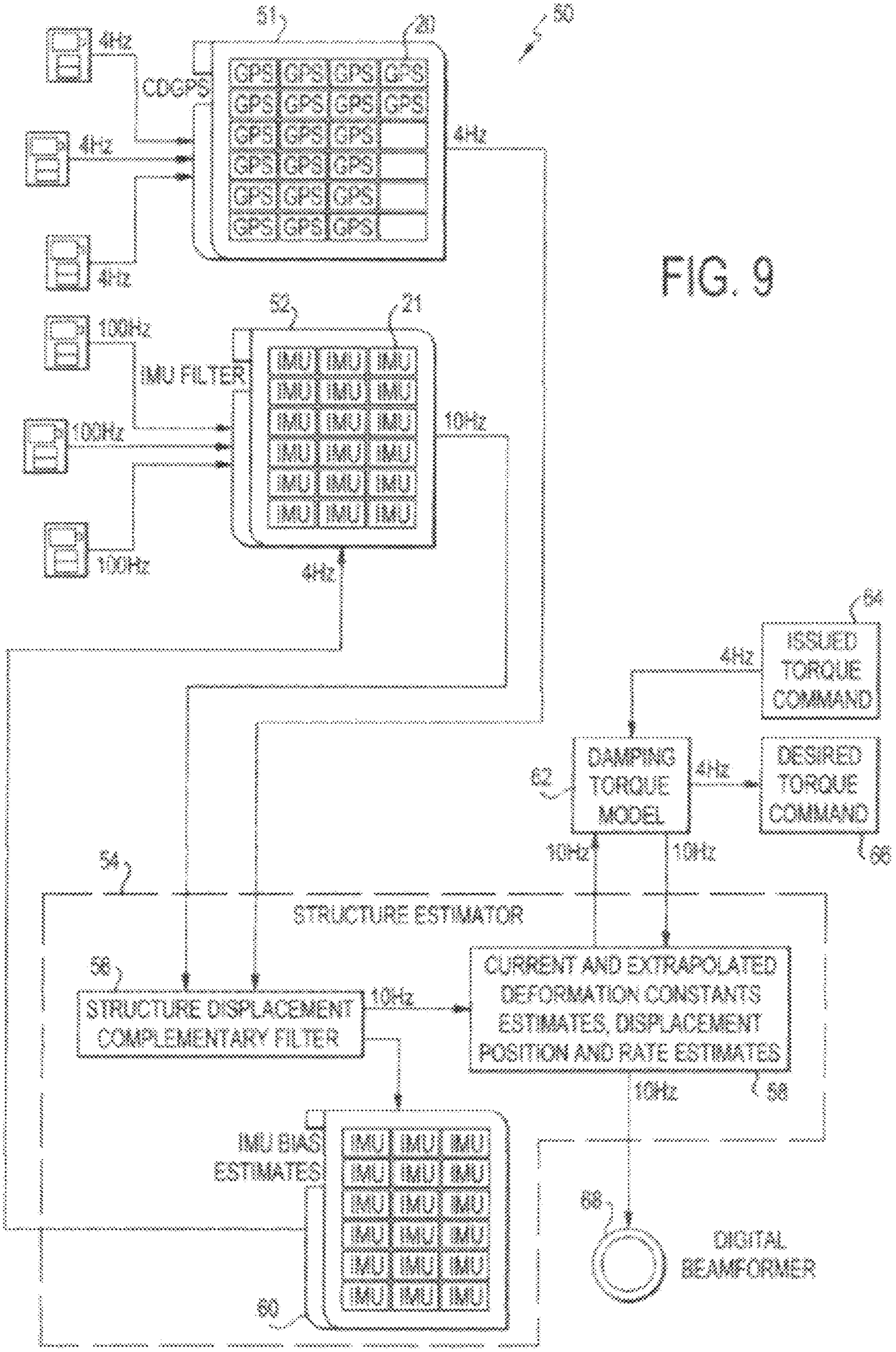
FIG. 9 is a block diagram overview of one embodiment of the present disclosure.

FIG. 9 is one embodiment of the disclosure in which the structure 10 in FIG. 7 has a single Global Positioning System (GPS) unit that reports carrier phase data. A collection of such antenna elements collectively contain a set of GPS units 50 whose data is used to calculated a Carrier Phase Differential GPS (CD-GPS) array 51 of differential GPS solution 212. Each structure 10 also includes an Inertial Measurement Unit 49, and the collective IMU data is compiled in an array 52 of filtered IMU measurements 515. Such IMUs may be inertial sensing units which integrate acceleration only and/or directly detect angular motion, or other such inertial measurement devices.

The embodiment in FIG. 9 also includes a structure estimator 54 a computed torque model 62 based on that structure estimator, a torque command 66 issued to a torque mechanism, and a feedback element 64 from that torque mechanism. In one embodiment, the GPS sensors 50 are positioned as close as possible to the IMU sensors 49. The GPS sensors 50 and/or IMU sensors 49 are coupled to the structure elements 10; each structure 10 can have one or more GPS sensor 50 and one or more IMU sensor 49, or one GPS sensor 50 and/or one IMU sensor 49 can be associated with multiple structures 10. In one embodiment, the IMU sensors 49 are accelerometers that detect an acceleration.

Thus, FIGS. 4, 5, 7, 8 depict the main types of perturbations that are likely to occur. The effect of FIGS. 4, 5 are shown in FIG. 6, and the effects of FIGS. 7, 8 are shown in Table 1 below.

TABLE 1

| Uniformly distributed random X, Y and Z perturbations of small satellite from nominal antenna element spacing | Maximum side-lobe level relative to main-lobe level (dBc) | |
|---|---|---|
| | Edge beam | Boresight beam |
| 0% | −32 | −34 |
| 0-3% | −31 | −32 |
| 0-6% | −27 | −30 |
| 0-9% | −25 | −28 |
| 0-12% | −24 | −26 |
| 0-15% | −22 | −24 |
| 0-25% | −18 | −21 |

The effect of modal array deformation and caused by coupled flexure on beamforming can be minimized by considering the instantaneous position of each antenna element while computing the corresponding phases used for beamforming. This is accomplished by placing position sensors 20 (FIGS. 2, 7(*a*)) and IMUs 49 in several of the small satellites 10 for accurate position and rate estimation of each antenna element or minimum required sensors, to predict the uniform perturbation characteristic of the small satellites across array, to determine approximate position of each small satellite. For example, each small satellite 10 can have one or more sensors that are placed on the body of the structure, such as on the communication side (the side with the antennas 19) or the solar side (the side with the solar cells 17). The sensor placement is determined by the type of sensor to ensure observability of the sensed effect. In the current embodiment, the GPS antenna attached to the receiver 50 must face the GPS constellation and therefore must be on the solar side of the antenna element structure 10. In one embodiment, a single sensor 20 can be provided for multiple small satellites. The IMU may be placed near the center of the structure 10.

As shown in FIG. 11, each pair of GPS receivers must observe overlapping signals from the GPS constellation. The sensors can, for example, be part of the electronic circuits that form the small satellite. Reference X, Y and Z planes for a nominal array are shown in FIG. 7(*a*). The sensors can be a standard Global Positioning System (GPS) receivers or other sensor device that automatically estimates position in a global co-ordinate system to the accuracy of carrier phase differential GPS (approx. 2 cm relative accuracy).

The sensor 50 in this embodiment is a standard Global Positioning System (GPS) sensor device that automatically estimates position in a global co-ordinate system and provides carrier phase and pseudorange output data for individual received GPS signals. As shown in FIG. 11, the GPS receivers 50 reside at different locations 298 and 299 on the satellite 202. Each receiver senses its position 160 relative to common GPS satellites (exemplified here as 135, 137), then use carrier phase information 152 as it changes 154 over time 150 to determine relative location 170 of the receivers. A group of such sensors 50 with mutually common received signals results in a set of solutions 51 providing relative offsets 170 between the receivers 50. This process is known as CD-GPS and is well-documented in academic and technical papers, though any suitable technique can be utilized. In order to perform the system operations described herein, the number of CD-GPS solutions 51 need only exceed some minimum requirement. There is no theoretical maximum to the number that may be used, as additional solutions tend to improve the solution.

As noted, any bending, flexing, deformation or perturbations in the array result in a change in distance between the various small satellites 10, which in turn can cause signals transmitted or received by one or more of the small satellites to deviate or be out of phase from the desired phases, that can degrade the aggregate signals from all the small satellites. Thus, the system of the present disclosure conducts a position correction for each of the antenna elements 19 in small satellites 10 so that their phases align when aggregated towards/from the intended beam direction. The phase is determined by frequency, the azimuth and elevation scan angles towards the direction of the beam and the relative position of the antenna elements across the small satellites and the array.

The beamforming phase (in radians) of each antenna element is given by:

$$\phi_e = 2\pi(f_c/c)\cdot[X_e Y_e Z_e]\cdot[\sin(El)\cos(El)\cdot\sin(Az)\cos(El)\cdot\cos(Az)]'$$

where, $f_c$ is carrier frequency (in Hz); c is the speed of light (in m/s), $X_e$, $Y_e$ and $Z_e$ are positions of each antenna element 10 (in meters) relative to the geometrical center of the nominal array plane in master co-ordinate system (nadir defined in Z-direction); and Az and El are Azimuth and Elevation scan angles of a target beam (in radians) relative to the nominal array reference plane. The sensors 20 can be a standard Global Positioning System (GPS) sensor device that automatically estimates position in a global co-ordinate system. The GPS sensors 20 sense the position (typically to about 1 meter), for instance the X, Y, Z, then the position relative to the geometric center are determined by the processor 12 based on those GPS coordinates. The beamforming phase is used to determine the phase compensation in degrees (360×displacement/wavelength, where wavelength is calculated at the carrier frequency of communication. The phase of each antenna element 10 is different from its neighbor based on the direction where the beam is pointed; when the elements 10 are displaced away from that plane, the phase is adjusted based on the displacement of the element from the plane.

Figure 10:
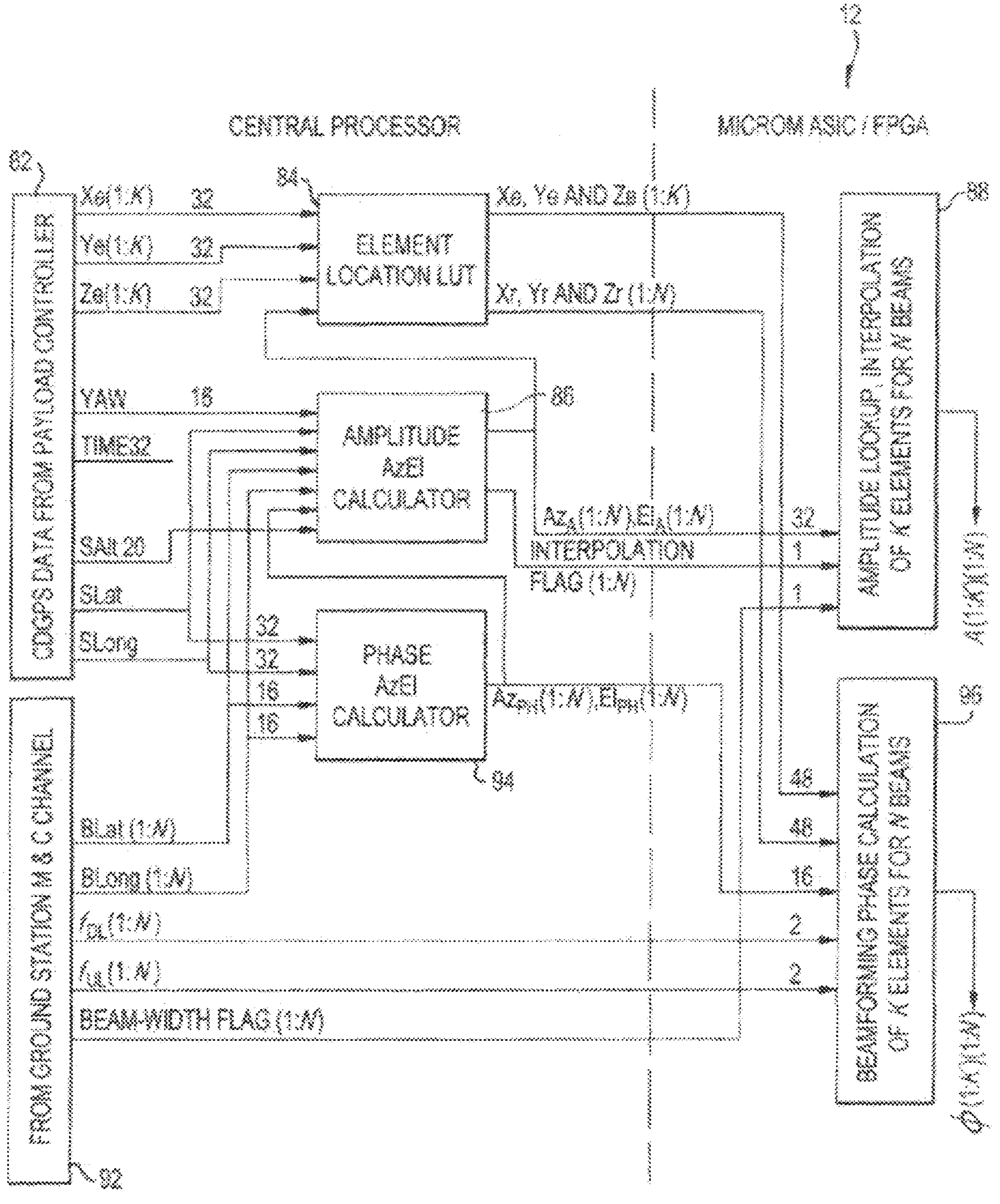
FIG. 10 shows the flow of information in deriving beamforming amplitude and phases of antenna elements for antenna element beamforming phase (ø) computation.

FIG. 10 shows an antenna element beamforming phase (ϕ) computation, and in particular the flow of information in deriving beamforming amplitude and phases of antenna elements, using the variables shown in Table 2 below. As shown, certain operation of FIG. 10 can be performed by a processing device at the central controller 200 (FIGS. 1(*a*), 1(*b*)), and by the processing device 12 of the antenna element 10.

TABLE 2

| Parameter | Bits | Description |
|---|---|---|
| BLat(1:N) | 16 | Latitude of N beams in Earth Centered Earth Fixed (ECEF) format |
| BLong(1:N) | 16 | Longitude of N beams in ECEF format |
| $f_{DL}$ | 16 | Downlink frequency |
| $f_{UL}$ | 16 | Uplink frequency |
| SAlt | 20 | Satellite Altitude in meters |
| SLat | 32 | Satellite Latitude in ECEF format |
| SLong | 32 | Satellite Longitude in ECEF format |
| Yaw | 16 | Yaw angle of the array |
| Time | 32 | Epoch, Unix Timestamp |
| Xe(1:K), Ye(1:K) and Ze(1:K) | 32 | X, Y and Z co-ordinates of K elements in ECEF format normalized to center of the array |
| $A_{ZPH}$(1:N)and $El_{PH}$(1:N) | 16 | Azimuth and phase angles of N beams for phase vector computation in Micron ASIC/ FPGA |
| AZA(1:N) and $El_A$(1:N) | 16 | Azimuth and phase angles of N beams for amplitude lookup and interpolation in Micron ASIC/ FPGA |
| Xr(1:N), Yr(1:N) and Zr(1:N) | 32 | X, Y and Z co-ordinates of reference elements to mark the center of sub-arrays used to generate N beams |
| ϕ(1:K)(1:N) | 16 | Phases of K elements for N beams |
| A(1:K)(1:N) | 16 | Amplitudes of K elements for N beams |

FIG. 10 shows, in block diagram form, the various elements of the beamforming/compensation system. The monitor and control (M&C) channel 92 from the ground station indicates which beams (cells) must be illuminated by the satellite array (in terms of latitude/longitude), the beamwidth (whether for normal-sized coverage—typically 48 km diameter in 4G—or enlarged coverage—typically 144 km) as well as the carrier frequency/frequencies to be used by those beams. The payload controller 82 collects data from the various CDGPS sensors 20 and inertial sensors 21 and fuses the data into a consistent set of array element positions 84, as well as determining the nominal attitude of the micron array.

From this consistent set of array element positions, the central processor (at the Control satellite 200) computes the amplitude table's elevation/azimuth 86 and phase calculator's elevation/azimuth indices 94 for each beam that is to be illuminated by the micron array at certain (coarse) timing instants. The amplitude 88 and phases 96 to be applied varies according to the location of the satellite element 10 in the array, as well as its displacement from its nominal array position. These are computed at the central processor and distributed to the satellite elements 10. To obtain amplitude and phases at intermediate instants, the micron array, may if required, interpolate that data. The small satellites 10 together may then create both transmit and receive beams, at the appropriate carrier frequencies, for the beams.

The following equation shows the corrections in phase because of displacement of elements from their nominal positions:

$$DirCosineVec = [r\cdot\sin(El_{PH});$$

-continued $$r \cdot \cos(El_{PH}) \cdot \sin(Az_{PH});\ r \cdot \cos(El_{PH}) \cdot \cos(Az_{PH})]$$

$$\text{Relative delay, } RelDelay = \left(\frac{1}{c}\right) \cdot [X_e - X_r;\ Y_e - Y_r;\ Z_e - Z_r] \cdot DirCosineVec'$$

$$\text{Beamforming phase (in radians), } \phi = 2 \cdot \pi \cdot f_c \cdot RelDelay$$

where, $f_c$ is frequency of operation (in Hz) and c is speed of light (in m/s); x is the direction cosine vector in North (x-axis) direction; y is the direction cosine vector in the East (y-axis) direction; and z is the direction cosine vector in the Down (z-axis) direction.

Thus, the system compensates for flexing by measuring displacements in each antenna element in X, Y and Z axes and then correcting the phase of each antenna element accordingly. If there was no flexure, then X, Y, Z could be set as a constant. The system operates dynamically and in real-time providing the required phases without manual interaction, while the sensors continually sense the X, Y, Z position. The placements of the sensors 49 and 50 in the example realization are chosen to coincide with the maximum displacements due to the primary oscillation modes of the aperture structure. Because the beamforming phase is used to determine the phase compensation based on the displacement of the structure elements 10 from a planar configuration, the system must compensate for any additional flexing by mechanically correcting the relative positioning of the spacecraft elements 302 where possible. Where each small satellite 10 has its own sensor 20, the deviation/phase correction can be determined based on the position of that sensor. However, where a single sensor is provided for multiple small satellites, the deviation and phase correction for each small satellite 10 can be extrapolated based on the positions of that surrounding small satellites with respect to the sensor. The displacements and phase correction can be determined locally by the processor 12 at that small satellite 10, or at a centrally located processor such as at the central satellite 200 (FIG. 1(*a*)) by calculating the apparent modal excitation 88. Determining the displacements resulting from these modes offers information that can be used to counteract their effects through a variety of means, and directly controlling these modes can improve spacecraft performance.

The placement of the sensors 20 is chosen (based on the oscillation modes of the aperture structure) so that the locations of all antenna elements 10 can be computed by spatial interpolation, which are communicated to a central processor that computes the beamforming phase vectors of all the antenna elements in the array according to the equation shown above.

The GPS sensors 20 provide the estimated X, Y and Z positions, which are used to compute the Xe, Ye, and Ze parameters in the formula instead of assuming them to be at a known position in nominal plane, based on the geometry.

The example considering a 10.3 m array with 8.7 degrees flexing is already mentioned above with respect to FIGS. 4, 5, whose measurements are given in FIG. 6. Another example, assuming uniform random perturbations was also considered, whose measurements are given in Table 1 above.

Thus, FIGS. 4-5, 7-8 illustrate the different internal or local movement (i.e., such as bending, flexing) of a large structural array in space formed by small structural elements 10, such as microns or satellites. In addition, a flexible spacecraft platform with low-frequency modal behavior can cause issues with pointing maintenance across that platform. Determining the displacements resulting from these modes offers information that can be used to counteract their effects through a variety of means, and directly controlling these modes can improve spacecraft performance. The present system resolves that measurement problem with a real-time estimation algorithm and integrates the solution with space-capable actuators to perform closed-loop control.

The motion is determined initially using a set of sensors 20 that provide location- or position-based measurements, which in one embodiment can be GPS receivers performing carrier-phase differential (CD-GPS) measurements. This can be conducted in accordance with any suitable manner for determining the position and velocity difference between any pair of GPS units 20, precise to ≈2 cm relative displacement. On a large, flexible structure though, multiple such CD-GPS solutions can be combined to improve the estimate of displacements with respect to one another. If the GPS units 20 are located near highly mobile regions of the structure 10 when experiencing a modal displacement, the CD-GPS solutions allow an estimate of the coefficients associated with a mathematical model of that displacement.

Because of the limitations of CD-GPS computation rates, these estimates are computed in real-time between available CD-GPS solutions by inertial measurement unit (IMU) data provided at a much higher rate. Timing misalignments between CD-GPS and IMU solutions are resolved via propagation of the existing solution.

The coefficients estimated using these integrated solutions are made available at a high rate for a specific digital beamforming application. However, such modal estimation can be made available for a variety of purposes.

FIG. 9 is one embodiment of the disclosure in which the antenna element 10 has a Carrier Differential GPS (CDGPS) array 51 of individual GPS sensors 20, an IMU array 52 of individual IMU sensors 21 (or inertial sensing units which integrate acceleration twice to obtain displacement), a structure estimator 54, and a torque mechanism. In one embodiment, the GPS sensors 20 are positioned as close as possible to the IMU sensors 21. The GPS sensors 20 and/or IMU sensors 21 are coupled to the antenna elements 10; each antenna element 10 can have one or more GPS sensor 20 and one or more IMU sensor 21, or one GPS sensor 20 and/or one IMU sensor 21 can be associated with multiple antenna elements 10. In one embodiment, the IMU sensors 21 are accelerometers that detect an acceleration. From the acceleration, the system can also determine velocity and displacement, namely integrating acceleration gives velocity, and integrating velocity gives displacement. The acceleration data can be utilized to predict where the antenna element 10 will be.

As shown, the estimator 54 includes a structure displacement complementary filter 56, and a correction and control module 58. The filter 56 receives position data from the GPS sensors 20 in an array format and receives acceleration data from the IMU sensors 21 in an array format. The filter 56 fuses or combines the position data and the acceleration data. The position data alone only provides accuracy to about 1 meter; however, fusing the position data with the acceleration data provides accuracy to a few millimeters (perhaps 3-8 mm or better). That data fusion can be accomplished in any suitable manner, such as by a Weiner filter and checking for outliers.

The displacement filter 56 utilizes the position and acceleration data to determine the current displacement of the antenna element 10. For example, the displacement filter may determine that the specific antenna element 10 is displaced by 5 mm, meaning that it is 5 mm from where it should be.

The displacement filter 56 outputs the displacement data to the correction and control module 58, which applies a physical displacement to the antenna element 10 to correct for the displacement. The correction and control module 58 uses current and extrapolated deformation constant estimates and determines displacement position and rate estimates. It then applies the correction to a drive device such as a torque actuator or torque mechanism by a damping torque model 62, which sends a torque command 64, 66 to the torque rod. The torque rod then applies a torque to the antenna element 10 to move the antenna element 10 back to the desired position. Thus, the processing device (either at the array of antenna elements or at the central controller 200) operates the drive device to move one or more of the plurality of antenna element structures 10 to correct for structural displacement of the antenna element structures.

The correction and control module 58 also outputs the displacement data (e.g., the 5 mm displacement) to the digital beamformer 68. The digital beamformer 68 computes and applies a phase correction to the beam. It can compute for individual sensor points, or take into account other sensor points.

In addition, the displacement filter 56 outputs the displacement data (e.g., 5 mm displacement) to provide an IMU bias estimate table 60 that feeds back to the IMU array 52. Thus, the displacement filter 56, IMU bias estimates 60, and IMU filter 52 provide a feedback loop that resets the conditions in displacement and velocity so that the next IMU reading is more accurate. It will be recognized that the feedback loop can proceed from the correction and control module 58, instead of the displacement filter 56. The control loop can include both digital and mechanical components, forming an Altitude and Orbit Control System (AOCS).

Each CD-GPS 51 solution is specific to a single time. As a result, given N GPS inputs, the time at which the estimation occurs can vary quite a bit. As shown in FIG. 9, bias estimation is performed at a constant rate regardless of the number of CD-GPS solutions available. Because the CD-GPS data directly indicates how the structure constants must be updated, it also allows an updated estimate of the bias in each IMU 52. The combined IMU and CD-GPS data from the sensors 20, 21 also allows a precise update of the structure constants. During this step, it is also possible to estimate the motion of the center of mass of the spacecraft, as the structure constants provide a specific mapping of how different elements 10 are moving with respect to that center of mass.

During a high-rate IMU-only phase, the IMU biases estimated during the low-rate CD-GPS updates are subtracted from the IMU solutions to obtain a precise measure of the motion of the many structure elements. This motion maps to a specific structure constant set that is close to but not necessarily exactly described by the low-rate solution. The IMU-only phase also updates structure constants using a Kalman filter, this time by propagating the structure constant dynamics model and taking only the IMU output as expected measurements. Bias estimates are held constant until the next CD-GPS update. Central spacecraft motion effects are removed from the measured IMU data. Note that the measured motion of the central spacecraft may also include motion associated with the structural modes, so a mean motion estimate using all IMU information can be made if no central spacecraft motion update is available.

The combined low-rate CD-GPS and high-rate IMU estimation technique is shown in FIG. 9, which shows the detail of the estimator 80 with the propagation loop utilizing a known spacecraft angular rate (here labeled "CS west") to remove known angular rates from the solution.

This system also establishes a structural mode control for a large, flexible spacecraft that is symmetric across the center of mass. The control law associated with the estimated CD-GPS/IMU mode dynamics can take any basic nonlinear form, or a linear form if the structure is sufficiently rigid. Because mode motion is oscillatory as a function of the estimated mode shape constants, and because digital compensation for some motion is possible, the selected control law need only force the system to remain within an allowable equilibrium motion.

For systems with a significant first bending mode (see FIGS. 3-4), bending of the longest beam of the system about a perpendicular eigenaxis can a locally linearized as a 1-dimensional Euler-Bernoulli beam. Bending is approximately quadratic. The controller is designed only to stabilize the first mode, so a constraint is placed on the energy imparted to the system ($|u|<|u_{max}|$) to prevent possible excitation of additional modes. As noted above, control is imparted symmetrically about the inertial eigenaxes. Deformation energy is driven to 0, with a hysteresis enacted to limit chatter as the allowed maximum deformation is achieved.

Thus, as described above, the present system determines the amount of local movement of the structural array 30, and then corrects that. It is further noted that co-pending application Ser. No. 17/175,262, which is based on provisional application No. 62/976,143, determines the amount of flexing or bending of the structural array 5, and then corrects that by performing torque-rod control that compensate for the bending, such as performed by the control module 58, torque model 62, and torque commands 64, 66 (FIG. 9). The entire content of that application is incorporated herewith.

In one example embodiment, structure 10 is an antenna assembly with a solar panel that receives solar energy from the Sun and generates solar power for use by the structure. The overall structure is flat and rectangular or square, such as a tile, with the communication components (e.g., antenna elements) at one side surface facing the Earth (nadir) to communicate with user devices (e.g., cell phones) and an opposite side surface facing in the opposition direction (zenith) with solar cells that generate solar power for use by the electronic components, e.g., a processing device, antennas, antenna front end modules. Here the control satellite 200 is fixedly connected to the small satellites 302, shown at the center of the array 100 and visible in the array 5.

It is important that the structure 10 and the array 5 remain as flat (i.e., planar) as possible to maximize solar power generation by the solar side and communication with the Earth on the communication side. Thus, it is desirable for the array 5 to be substantially flat, i.e., that the structures 10 are flat and that they are planar with one another. However, the structure 10 and/or array 5 is subject to forces in space that can cause the structure 10 or array 5 to flex or bend. To correct for any bending or flexing, the structure 10 has symmetrically-placed GPS units 50, inertial measurement units 49, and actuators 23 on each small spacecraft.

To correct for any bending or flexing at the connectors which attach each of the antenna elements to its neighboring elements, the processing device 12 or a central processor determines the flex or bending of the array 5 or structure 10. The processing device of the structure 10 and/or array 5 dynamically monitors the structure 10 and/or array 5 in real time for small displacements due to structural modes of the structure 10 or array 5. That can be done, for example by monitoring the GPS sensors 20 positioned at one or more of the antenna assemblies 10, which provides position and velocity using carrier-phase differential GPS (CD-GPS) 51. And, by monitoring the IMU sensors 21, which are positioned as close as possible to the GPS sensors and provide acceleration data from which position data is further determined. The processing device determines a structural or physical correction and activates a mechanical device to apply a force to the antenna elements to physically move the antenna elements toward the planar configuration. The processing device also determines an adjustment to electronically correct for any residual displacement that is not corrected by the physical correction. In one embodiment, the processing device applies a phase correction to the beam to correct for any displacement that is not corrected by the physical correction.

When the structure 10 is configured as an antenna array 5, it (e.g., antenna 19 or antenna elements) communicates with processing devices on Earth, such as for example a user device (e.g., cell phone, tablet, computer) and/or a ground station. The present disclosure also includes the method of utilizing the structure 10 to communicate with processing devices on Earth (i.e., transmit and/or receive signals to and/or from). The present disclosure also includes the method of processing devices on Earth communicating with the structure 10 (i.e., transmit and/or receive signals to and/or from). In addition, while the structure 10 is used in Low Earth Orbit (LEO) in the examples disclosed, it can be utilized in other orbits or for other applications. Still further, while the system has been described as for an array of antenna assemblies, the system can be utilized for other applications, such as for example data centers, telescopes, reflectors, and other structures, both implemented in space or terrestrially. The system of the present disclosure can also be utilized in combination with a structural correction system, such as shown and described in U.S. application Ser. No. 17/175,262, filed Feb. 12, 2021, entitled AOCS System To Maintain Planarity For Space Digital Beam Forming Using Carrier Phase Differential GPS, IMU And Magnet Torques On Large Space Structures, and claiming priority from U.S. Application No. 62/976,143, filed Feb. 13, 2020, the entire contents of which are hereby incorporated by reference.

In addition, it is noted that operation is described as occurring at the control satellite 200, which may or may not be fixedly embedded in the array. However, operation can also be at the common satellite 10 processing device 12 if GPS and IMU data from other structures 10 is distributed in such fashion. In another embodiment of the present disclosure, data (such as position and attitude) can be transmitted from the satellite 10 and/or 200 (e.g., by the common satellite processing device 12 and/or the control satellite processing device, if such are not coincident) to a ground station. The ground station processing device can then determine the necessary correction and/or other flight information and transmit a control signal to the satellite 10 and/or 200 (e.g., common satellite processing devices 12 and/or control satellite processing device) to control the correction via the torque rod 23, in addition to performing other ground-based tasks.

It is further noted that the drawings may illustrate and the description and claims may use several geometric or relational terms and directional or positioning terms, such as planar, linear, curved, circular, flat, left, and right. Those terms are merely for convenience to facilitate the description based on the embodiments shown in the figures, and are not intended to limit the disclosure. Thus, it should be recognized that the system can be described in other ways without those geometric, relational, directional or positioning terms. In addition, the geometric or relational terms may not be exact. For instance, walls or surfaces may not be exactly flat, or planar to one another but still be considered to be substantially planar because of, for example, roughness of surfaces, tolerances allowed in manufacturing, etc. And, other suitable geometries and relationships can be provided without departing from the spirit and scope of the disclosure.

The foregoing description and drawings should be considered as illustrative only of the principles of the disclosure. The system may be configured in a variety of shapes and sizes and is not intended to be limited by the embodiment. Numerous applications of the system will readily occur to those skilled in the art. Therefore, it is not desired to limit the disclosure to the specific examples disclosed or the exact construction and operation shown and described. Rather, all suitable modifications and equivalents may be resorted to, falling within the scope of the disclosure.

The invention claimed is:

1. A system comprising:

a plurality of antenna element structures each having a surface, the plurality of antenna element structures operatively connected to form a substantially planar phased array; and a processing device operatively coupled to the plurality of antenna element structures, the processing device being configured:

to determine a structural displacement of one or more of the plurality of antenna element structures in an operating environment in space, to determine in real time a displacement correction based on the determined structural displacement, and to cause a phase adjustment based on the displacement correction for closed-loop control.

2. The system of claim 1, wherein determination of the structural displacement is based on sensor data received from one or more sensors associated with the plurality of antenna element structures.

3. The system of claim 2, further comprising the one or more sensors.

4. The system of claim 2, wherein the one or more sensors comprises a position sensor coupled to one or more of the plurality of antenna element structures.

5. The system of claim 2, wherein the one or more sensors comprises an acceleration sensor coupled to one or more of the plurality of antenna element structures.

6. The system of claim 1, wherein determination of the structural displacement is based on a sensed position of at least a given one of the plurality of antenna element structures and a sensed acceleration of at least a selected one of the plurality of antenna element structures.

7. The system of claim 6, wherein the selected antenna element structure is the same as the given antenna element structure.

8. The system of claim 1, further comprising at least one solar cell coupled to at least one of the plurality of antenna element structures.

9. The system of claim 1, wherein the structural displacement comprises a deformity in the substantially planar phased array.

10. The system of claim 9, wherein the processing device is configured to correct for the deformity in real time by applying a mechanical force to move one or more of the plurality of antenna element structures.

11. The system of claim 1, wherein the plurality of antenna element structures is operatively connected via a set of connectors.

12. The system of claim 11, wherein the set of connectors has default bias to a deployed configuration in order to form the substantially planar phased array.

13. The system of claim 1, wherein the system is configured for operation in at least one of low earth orbit or medium earth orbit when the substantially planar phased array is deployed.

14. The system of claim 1, wherein the system is configured to directly communicate with a set of end user devices on Earth.

15. The system of claim 14, wherein the system is further configured to communicate with a gateway at a ground station distinct from the set of end user devices.

16. A system comprising:

a plurality of antenna element structures each having a surface, the plurality of antenna element structures operatively connected to form a substantially planar phased array; and a processing device operatively coupled to the plurality of antenna element structures, the processing device being configured:

to determine a structural displacement of one or more of the plurality of antenna element structures, to determine a displacement correction, and to cause a phase adjustment based on the displacement correction, wherein the processing device is configured:

to cause the phase adjustment as a fine correction; and to further cause structural compensation to be performed on the phased array as a coarse correction.

17. The system of claim 1, further comprising a set of sensors, wherein:

a first sensor of the set of sensors is a first sensor type;

a second sensor of the set of sensors is a second sensor type different than the first sensor type; and the processing device is configured to fuse data from the first and second sensors into a set of element positions associated with the plurality of antenna element structures.

18. A method for communicating comprising:

determining, by a processing device, a structural displacement of one or more of a plurality of antenna element structures in an operating environment in space, the plurality of antenna element structures operatively connected to form a substantially planar phased array;

determining, by the processing device in real time, a displacement correction based on the determined structural displacement; and causing, by the processing device, a phase adjustment based on the displacement correction for closed-loop control.

19. The method of claim 18, wherein determining the structural displacement is based on a sensed position of at least a given one of the plurality of antenna element structures and a sensed acceleration of at least a selected one of the plurality of antenna element structures.

20. The method of claim 18, wherein:

the structural displacement comprises a deformity in the substantially planar phased array; and the method further comprises correcting for the deformity in real time by applying a mechanical force to move one or more of the plurality of antenna element structures.

* * * * *